United States Patent Office 3,159,664
Patented Dec. 1, 1964

3,159,664
CYCLOPENTENYL ESTERS OF 2-MERCAPTO-2-THIONO 1,3,2-DIOXAPHOSPHORINANE AND 1,3,2-DIOXAPHOSPHOLANE ACIDS
Jeffrey H. Bartlett, New Providence, N.J., assignor to Esso Research and Engineering Company, a corporation of Delaware
No Drawing. Original application Aug. 12, 1955, Ser. No. 528,112. Divided and this application Mar. 30, 1960, Ser. No. 18,474
2 Claims. (Cl. 260—461)

This invention relates to a new class of chemical compounds and more particularly relates to cyclo-organo compounds of phosphorus and derivatives thereof. The invention also relates to methods of preparing such compounds and to the uses of such compounds, particularly as lubricant additives and as agricultural chemicals.

The new class of chemical compounds of this invention contains the following molecular structure:

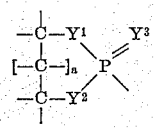

where $Y^1$, $Y^2$ and $Y^3$ each represent a sulfur atom or an oxygen atom and "$a$" is a number of value 0 or 1. The primary cyclo-organo compounds of phosphorus are prepared by the reaction of dihydric organic compounds with phosphorus pentasulfide, phosphorus pentoxide, phosphorus oxyhalide, phosphorus thiohalide or mixtures thereof. Derivatives of these primary cyclo-organo compounds of phosphorus, which are prepared by reacting the primary compound with olefinic compounds, halogenated organic compounds, aldehydes, hydroxy organic compounds, epoxides, nitrogen bases, metal bases and the like, are the preferred compounds of the present invention.

THE DIHYDRIC ORGANIC COMPOUNDS

The dihydric organo compounds useful in preparing the primary cyclo-organo compounds of phosphorus contain the following molecular structure:

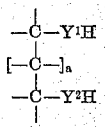

where $Y^1$ and $Y^2$ each represent a sulfur atom or an oxygen atom, preferably an oxygen atom, and "$a$" represents a number of 0 or 1. In general it is preferred to use dihydric organic compounds having the following general formula:

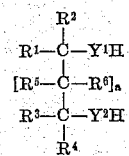

where $R^1$, $R^2$, $R^3$, $R^4$, $R^5$ and $R^6$ are hydrogen atoms or organic radicals. These organic radicals preferably contain in the range of about 1 to 20 carbon atoms, more preferably about 1 to 10 carbon atoms. It is particularly preferred that the R radicals be hydrogen atoms or alkyl groups containing 1 to 10 carbon atoms. The preferred dihydric organic compounds are those wherein the R radicals are selected from the group consisting of hydrogen atoms and methyl radicals. If desired, the R radicals may contain substituents such as halogen atoms, —$NO_2$, —CN, —OR, —COOH and —COOR groups.

The preferred dihydric organic compounds useful in preparing the primary cyclo-organo phosphorus compounds of this invention are of two general types, namely:

Type I

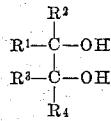

and Type II

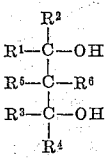

where the R radicals are selected from the group consisting of hydrogen atoms and alkyl radicals having 1 to 10 carbon atoms, preferably selected from the group consisting of hydrogen atoms and methyl groups.

Specific examples of the dihydric organic compounds useful in preparing the primary cyclo-organo phosphorus compounds of this invention include: ethylene glycol, propylene glycol, 1,2-butylene glycol, 1,3-butylene glycol; 2,3-butylene glycol, trimethylene glycol, 2,2-dimethylol propane, 2,2-dimethylol butane, 2,2-dimethylol pentane, 2,2 - dimethylol hexane, 2,2 - dimethylol decane, 1,1 - dimethylol cyclohexane, 1,1 - dimethylol cyclohexene, 3,3-dimethylol pentane, 3,3-dimethylol heptane, pinacols and 2-methyl-2-nitro-1,3-propane diol.

THE PRIMARY CYCLO-ORGANO COMPOUNDS OF PHOSPHORUS

The primary cyclo-organo phosphorus compounds which are prepared by the reaction of a dihydric organic compound as described above, or mixtures thereof, with phosphorus pentasulfide, phosphorus pentoxide, phosphorus oxyhalide, phosphorus thiohalide, or mixtures thereof contain the following molecular structure:

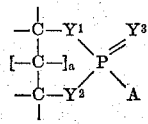

where A is either a halogen atom or a radical of the formula

and $Y^1$, $Y^2$, $Y^3$ and $Y^4$ are each a sulfur atom or an oxygen atom. The preferred primary cyclo-organo phosphorus compounds have the following general formula:

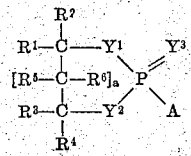

where A, $Y^1$, $Y^2$, $Y^3$, $Y^4$, $R^1$, $R^2$, $R^3$, $R^4$, $R^5$, $R^6$ and "$a$" have the aforementioned definitions.

These primary cyclo-organo phosphorus compounds may be prepared in accordance with the following chemical equations:

(1) 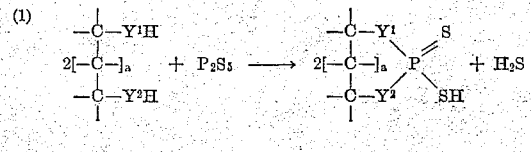

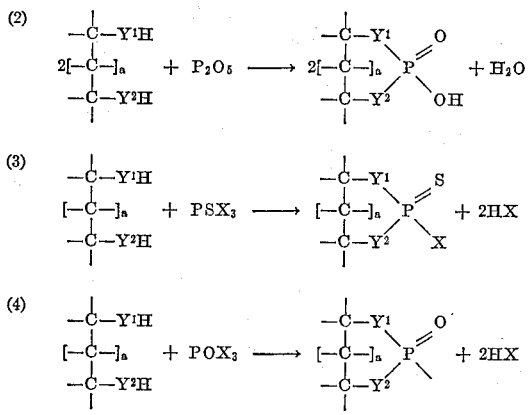

where X represents a halogen atom. It will be understood that mixtures of $P_2S_5$, $P_2O_5$, $POX_3$ and $PSX_3$ (where X represents a halogen atom) in any combinations and proportions may be employed. The preferred halides are chlorides, the bromides being second choice. The primary cyclo-organo phosphorus compounds wherein A is a halogen atom may be hydrolyzed to replace the halogen atom with the radical —OH.

The reaction between the dihydric organic compound and the inorganic phosphorus compound (i.e., $P_2S_5$, $P_2O_5$, $POX_3$, or $PSX_3$) is carried out using generally about 1 mole of the dihydric organic compound per mole of the phosphorus oxyhalide or phosphorus thiohalide, or using about 2 moles of the dihydric organic compound per mole of phosphorus pentasulfide or phosphorus pentoxide. The preferred inorganic phosphorus compound is phosphorus pentasulfide. These reactions may be carried out generally at temperatures in the range of about 30° C. to 150° C., preferably about 40° C. to 90° C. In general, the reaction will be complete after about 0.5 to 4 hours, usually after about 1 to 2 hours. This reaction may be carried out in the presence of an inert solvent such as benzene, toluene, tetralin, dioxane, naphtha, etc. It is desirable in carrying out the reaction to intimately mix the reactants. Upon completion of the reaction, it is preferred to filter the reaction product to remove any small amount of solid material present.

THE DERIVATIVES OF THE PRIMARY CYCLO-ORGANO PHOSPHORUS COMPOUNDS

The preferred compounds of this invention are derivatives of the primary cyclo-organo phosphorus compounds described above. A number of different types of derivatives may be prepared by reacting the primary cyclo-organo phosphorus compounds with several different types of compounds, thereby providing a variety of derivatives which have particular utility in a variety of applications. For different applications, therefore, different derivatives will be selected since the derivatives vary somewhat in their effectiveness in various applications.

The derivatives of the cyclo-organo phosphorus compounds contain the following molecular structure:

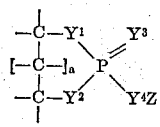

where $Y^1$, $Y^2$, $Y^3$ and $Y^4$ each represent a sulfur or oxygen atom. Preferably $Y^1$ and $Y^2$ represent oxygen atoms and $Y^3$ and $Y^4$ represent sulfur atoms. Z represents an organic or inorganic radical derived from an organic or inorganic compound, hereinafter described in greater detail, which is reacted with the primary cyclo-organo phosphorus compound.

The preferred derivatives of this invention have the following general formula:

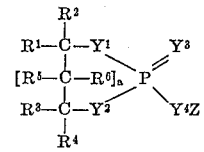

where the R's, Y's, Z and "a" have their aforementioned definitions. Preferably Z is an organic radical containing about 1 to 24 carbon atoms, more preferably about 4 to 18 carbon atoms. The preferred compounds may be considered to be of two different types, namely:

Type I

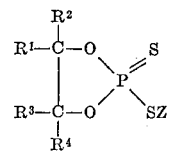

and Type II

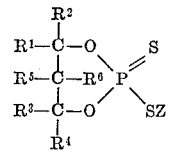

Preferably Z is an organic radical having 1 to 24 carbon atoms and selected from the group consisting of alkyl, aryl, aralkyl, alkoxy-alkyl, cyano-alkyl and alkylol radicals.

The following are specific classes of chemical compounds which may be reacted with the primary cyclo-organo phosphorus compounds to produce useful derivatives thereof:

(1) Unsaturated Organic Compounds

Included in this class of chemical compounds are olefinic and polyolefinic hydrocarbons. Substituted olefinic hydrocarbons such as those containing halogen atoms, nitro groups, primary, secondary and tertiary nitrogen atoms, alkoxy groups, ester groups, COOH groups, etc. may also be employed if desired. Specific examples of such unsaturated organic compounds include propylene, isobutylene, butadiene, isoprene, piperylene, styrene, chlorostyrene, nitrostyrene, vinyl ethyl ether, divinyl ether, vinyl acetate, vinyl caprate, vinyl oleate, isopropenyl acetate, acrylonitrile, methacrylonitrile, methyl methacrylate, methyl acrylate, maleic anhydride, maleic esters, maleamic acids, vinyl pyridine and vinyl ethylamine. Generally the derivatives are prepared by reacting about 1 mole of the unsaturated organic compound with about 1 mole of the primary cyclo-organo phosphorus compound, the reaction between the two compounds taking place between the radical A (where A is —$Y^4H$) of the primary cyclo-organo phosphorus compound and the double bond of the unsaturated organic compound. This reaction may be carried out at temperatures of about 0° to 200° C., preferably about 25° to 100° C., and the reaction will be completed generally after about 0.5 to 10 hours, usually after about 1 to 2 hours. Solvents such as benzene, toluene and ether may be utilized in this reaction.

These olefin derivatives (which are esters) are particularly preferred compounds of the present invention. They have been found to be outstanding lubricating oil additives, being particularly effective as anti-oxidants and corrosion inhibitors.

(2) Halogenated Saturated Organic Compounds

A particularly useful type of compound of this class is a chloromethyl ether. The chloromethyl ethers particularly preferred, which are prepared by reacting an alcohol with HCl and formaldehyde, have the general formula:

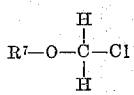

wherein $R^7$ is an organic radical having about 1 to 24 carbon atoms, preferably an alkyl radical. Specific chloromethyl ethers which may be employed include methyl chloromethyl ether, ethyl chloromethyl ether, isopropyl chloromethyl ether, butyl chloromethyl ether, n-amyl chloromethyl ether, isoamyl chloromethyl ether, n-hexyl chloromethyl ether, isooctyl chloromethyl ether, isodecyl chloromethyl ether, tridecyl chloromethyl ether, isohexadecyl chloromethyl ether, octadecyl chloromethyl ether, bis chloromethyl ether of ethylene glycol. Still further, aryl compounds may also be used such as benzyl chloride, bis chloromethyl benzene, bis chloromethyl toluene, etc. Other halogenated saturated organic compounds which may be employed include the following: methyl chloride, methyl bromide, methyl iodide, ethyl bromide, propyl bromide, butyl chloride, octyl bromide, isodecyl bromide, tridecyl bromide, bromoform and trimethylene bromide.

These halogenated saturated organic compounds may be reacted with the primary cyclo-organic phosphorus compounds wherein A is the radical —$Y^4H$. Preferably however, the primary cyclo-organic phosphorus compound is first converted to an ammonium salt or metal (e.g., sodium, potassium) salt which is then reacted with the halogenated compound in a double decomposition reaction. The double decomposition reaction is conveniently carried out at a temperature of about 25° to 200°, preferably about 50° to 150° C. The reaction will be completed generally after about 2 to 20 hours, usually about 3 to 8 hours. Generally about 1 mole of the halogenated saturated organic compound and 1 mole of the primary cyclo-organic phosphorus compound (or ammonium or metal salt thereof) will be employed.

(3) Aldehydes

The aldehydes useful in preparing the phosphorus derivatives of this invention have the general formula

where $R^8$ is an organic radical containing about 0 ($R^8$ is then a hydrogen atom) to 20 carbon atoms, preferably about 0 ($R^8$ is then hydrogen) to 10 carbon atoms. Preferably $R^8$ is an alkyl radical. About 1 mole of such aldehydes may be reacted with 1 mole of the cyclo-organo phosphorus compounds to produce a hydroxy derivative thereof having possibly the following formula:

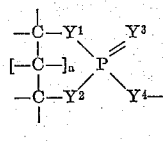

When about 2 moles of the cyclo-organo phosphorus compound are reacted with about 1 mole of aldehyde, a compound of the following general formula may be formed:

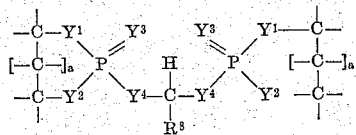

These aldehydes are reacted with cyclo-organo compounds of phosphorus wherein A in the formula is a radical of the formula —$Y^4H$. This reaction may be conveniently carried out at temperatures of about 0° to 150° C., preferably about 50° to 100° C. and the reaction will be completed generally after about 0.5 to 10 hours, usually after about 2 to 4 hours. Specific examples of aldehydes which may be employed include formaldehyde, acetaldehyde, propionaldehyde, n-butyraldehyde, isobutyraldehyde, valeraldehyde, hexaldehyde, octaldehyde, chlorol and acrolein.

(4) Hydroxy Organic Compounds

The cyclo-organo compounds of phosphorus wherein A is a halogen atom may be reacted with hydroxy organic compounds, preferably monohydric organic compounds such as alcohols and phenols. Preferably these monohydric compounds are monohydroxy substituted hydrocarbons but, if desired, alcohols, phenols and the like containing nitro groups, nitroso groups, halogen atoms, nitrilo groups and the like may be employed. Thioalcohols and thiophenols may likewise be employed. Generally about 1 mole of the hydroxy organic compound will be reacted with about 1 mole of the cyclo-organo phosphorus compound. This reaction may be carried out at a temperature of about 25° to 200° C., preferably about 50° to 150° C., and will generally be complete after about 0.5 to 10 hours, usually after about 1 to 4 hours. Specific examples of hydroxy organic compounds which may be employed include methanol, ethanol, butanol, isooctanol, phenol, cresol, octyl phenol, nonyl phenol, p-nitro phenol, o-m-nitro phenol, chlorophenol, di- and tri-chlorophenol, pentachlorophenol, ethyl mercaptan, propyl mercaptan and mercaptobenzothiazole.

(5) Epoxides

Hydroxy esters of the cyclo-organo phosphorus compounds, may also be prepared by reacting the cyclo-organo phosphorus compounds with epoxides employing generally a mole-for-mole ratio of the reactants. Alkylene oxides containing about 2 to 6, preferably about 2 to 4, carbon atoms per molecule may be employed. Styrene oxide is also a very useful epoxide reactant. These epoxides may be reacted with cyclo-organo phosphorus compounds wherein A is a radical of the formula —$Y^4H$. Specific examples of epoxides which may be employed include ethylene oxide, propylene oxide, butylene oxide, amylene oxide, styrene monoxide, butadiene monoxide and epoxides obtained from cyclohexane, butadiene polymers and copolymers, isoprene polymers, isobutylene-isoprene copolymers, oleic esters, terpenes, rubber latex.

Furthermore, pesticides, lube oil additives, etc., which possess an epoxide group may be improved by treatment with a cyclic dithiophosphoric acid, e.g., "Dieldrin" and "Endrin" treated with the dithiophosphoric acid from neopentyl glycol or β butylene glycol.

The reaction may be carried out at a temperature in the range of about 25° to 150°, preferably about 50° to 100° C., and will be complete after about 0.5 to 4 hours, usually after about 1 to 2 hours. Preferably the reactants are intimately mixed during the reaction.

(6) Nitrogen Bases

The cyclo-organo phosphorus compounds may be also reacted with nitrogen bases such as ammonia, amines, (primary, secondary or tertiary), guanidine, guanidine derivatives, amino-phenol, triethanol amine and the like. Generally about 1 mole of the nitrogen base will be employed per mole of the cyclo-organo phosphorus compound. However, in the case of primary amines, ammonia and other nitrogen bases having more than one active hydrogen atom, 2 or more moles of the cyclo-organo phosphorus compound may be reacted with 1 mole of the nitrogen base. Specific examples of nitrogen bases which may be employed include ammonia, methyl amine, dimethyl amine, trimethyl amine, ethyl amine, diethyl amine, propyl amine, octyl amine, monoethanol amine, diethanol amine, triethanol amine, p-amino phenol, p-phenylene diamine, diphenyl amine, pyridine, quinoline, guanidine.

The nitrogen bases may be reacted with cyclo-organo phosphorus compounds wherein A is a radical of the formula —$Y^4H$ or a halogen atom. The reaction between the phosphorus halide compounds of the present invention and nitrogen compounds possessing a hydrogen on the nitrogn atom may be carried out generally at a temperature of about 25° to 150° C., preferably about 50° to 125° C. and will be complete after about 1 to 10 hours, usually after about 2 to 4 hours. The addition of ammonia or an amine to the dithiophosphoric acid will take place at room temperature.

*(7) Metal Bases*

The cyclo-organo compounds of phosphorus may also be reacted with metal bases such as the oxides, hydroxides and carbonates. Preferred metal bases are those of the alkali metals, such as potassium and sodium, and alkaline earth metals such as calcium, barium and zinc. However, other metals such as aluminum, lead, iron, nickel, cadmium and the like may be employed.

Generally about "b" moles of the cyclo-organo phosphorus compounds will be reacted with 1 mole of the metal base, where b represents the valence of the metal. This reaction can be conveniently carried out at temperatures of about 50° to 200° C., preferably about 60° to 125° C., and will be complete after about 1 to 12 hours, usually about 2 to 6 hours. The derivatives so produced which are metallo-organic compounds of phosphorus have the following general formula:

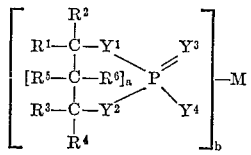

where M represents the metal and "b" represents the valence of M. Specific examples of metal bases which may be employed to prepare these derivatives include Na, K, Li, Ca, Mg, Ba, Zn, Cd, Sn, Sr, Ni and Cu.

The cyclic dithiophosphoric acids may also be converted into many valuable products by treatment with various agents which react with the SH group. This is especially exemplified in the oxidation of the dithiophosphoric acid to its disulfide, e.g.

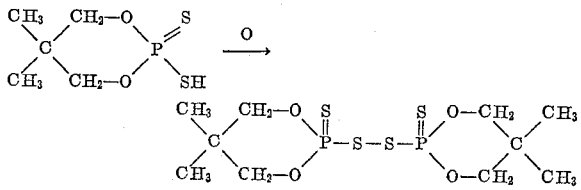

Such an oxidation may be effected by the use of air, $H_2O_2$, $NaNO_2+H_2SO_4$, $HNO_3$, $Cl_2$, etc.

A trisulfide may be produced by reaction of the dithiophosphoric acid with $SCl_2$, e.g.

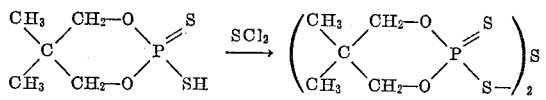

In like manner a tetrasulfide may be produced by use of $S_2Cl_2$

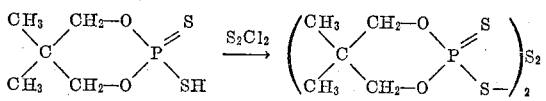

It may also be possible to reduce the amount of sulfur by formation of the monosulfide through treatment with NaCN, e.g.

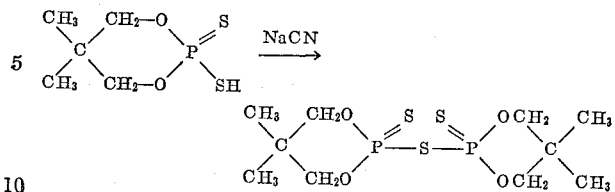

The dithiophosphoric acid also readily reacts with carboxylic acid chlorides, sulfonyl chlorides, isocyanates, $SOCl_2$, $SO_2Cl_2$, $POCl_3$, $PCl_3$, etc. to yield valuable products.

USES OF THE CYCLO-ORGANO PHOSPHORUS COMPOUNDS AND DERIVATIVES THEREOF

The present class of compounds, asd particularly the derivatives of the primary cyclo-organo phosphorus compounds, are useful as lubricant additives, particularly as oxidation-corrosion inhibitor additives for lubricating oil compositions. Generally the lubricating oil compositions of the present invention will comprise a major proportion of a lubricating oil and a minor corrosion inhibiting amount of the novel compounds of this invention, preferably the derivatives of the primary cyclo-organo phosphorus compounds. Generally about 0.01 to 10%, and preferably about 0.1 to 3% by weight, based on the total composition, of the present compounds will be employed in the lubricants.

The lubricating oil base stocks used in the compositions of this invention may be straight mineral lubricating oils or distillates derived from paraffinic, naphthenic, asphaltic or mixed base crudes, or if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced for example by solvent extraction with solvents of the type of phenol, sulfur dioxide, furfural, dichloroethyl ether, nitrobenzene, crotonaldehyde, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking coal tar fractions and coal tar or shale oil distillates may also be used. Also for special applications various organic esters or animal, vegetable or fish oils or their hydrogenated, polymerized or voltolized products may be employed, either alone or in admixture with mineral oils.

Synthetic lubricating oils having a viscosity of at least 30 SSU at 100° F. may also be used, such as esters of monobasic acids (e.g. ester of $C_8$ Oxo alcohol with $C_8$ Oxo acid, ester of $C_{13}$ Oxo alcohol with octanoic acid, etc.), esters of dibasic acids (e.g. di-2-ethyl hexyl sebacate, di-nonyl adipate, etc.), esters of glycols (e.g. $C_{13}$ Oxo acid diester of tetraethylene glycol, etc.), complex esters (e.g. the complex ester formed by reacting one mole of sebacic acid with two moles of tetraethylene glycol and two moles of 2-ethyl-hexanoic acid, complex ester formed by reacting one mole of tetraethylene glycol with two moles of sebacic acid and two moles of 2-ethyl hexanol, complex ester formed by reacting together one mole of azelaic acid, one mole of tetraethylene glycol, one mole of $C_8$ Oxo alcohol, and one mole of $C_8$ Oxo acid), esters of phosphoric acid (e.g. the ester formed by contacting three moles of the mono methyl ether of ethylene glycol with one mole of phosphorus oxychloride, etc.), halocarbon oils (e.g. the polymer of chlorotrifluoroethylene containing twelve recurring units of chlorotrifluorethylene), alkyl silicates (e.g. methyl polysiloxanes, ethyl polysiloxanes, methyl-phenyl polysiloxanes, ethyl-phenyl polysiloxanes, etc.), sulfite esters (e.g. ester formed by reacting one mole of sulfur oxychloride with two moles of the methyl ether of ethylene glycol, etc.), mercaptals (e.g. the mercaptal formed by reacting 2-ethyl hexyl mercaptan with formaldehyde), formals (e.g. the formal formed by reacting $C_{13}$ Oxo alcohol with formaldehyde), polyglycol type synthetic oils (e.g. the compound formed by condensing butyl alcohol with fourteen units of propylene oxide, etc.), or mixtures of any of the above in any proportions. Mixtures of these synthetic oils and mineral oils may likewise be used.

For the best results the base stock chosen should normally be that oil which without the new addition agents present gives highly satisfactory performance in the service contemplated. However, since one advantage of the agents is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the addition agent, although in some cases auxiliary solvent agents may be used. The lubricating oils, however they may have been produced, may vary considerably in viscosity and other properties depending upon the particular use for which they are desired, but they usually range from about 40 to 150 seconds Saybolt viscosity at 210° F. For the lubrication of certain low and medium speed diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of diesel service, particularly with high speed diesel engines, and in aviation engine and other gasoline engine service, oils of higher viscosity index are often preferred, for example, up to 75 to 100, or even higher viscosity index.

In addition to the materials to be added according to the present invention, other agents may also be used such as dyes, pour depressors, heat thickened fatty oils, sulfurized fatty oils, organo metallic compounds, metallic or other soaps, sludge dispersers, foam suppressing agents, anti-oxidants, thickeners, viscosity index improvers, oiliness agents, resins, rubber, olefin polymers, voltolized fats, voltolized mineral oils, and/or voltolized waxes and colloidal solids such as graphite or zinc oxide, etc. Specific examples of such other compounds include dibenzyl disulfide, sulfurized sperm oil, voltolized sperm oil, phenyl alpha naphthylamine, polyisobutylene, polymerized lauryl methacrylate, diamyl trisulfide, sulfurized wax olefins, tricresyl phosphate, 2,6-di-tert. butyl-4-methyl phenol, and the reaction product of phenol with sulfur chloride treated diisobutylene. Solvents and assisting agents, such as esters, ketones, alcohols, thioalcohols, amines, aldehydes, halogenated or nitrated compounds, and the like, may also be employed.

The present compounds are also useful additives (especially as anti-oxidants and corrosion inhibitors) in other mineral and synthetic products such as, for example, petroleum oil distillate products, e.g., gasoline, heating oil, diesel oils; greases, waxes, asphalts, flushing oils, cutting oils, solvent oils, transformer oils and the like. Generally useful concentrations of the present compounds in these products are in the range of about 0.01 to 5.0% by weight based on the total composition.

The present compounds are also useful as parasiticidal agents, that is, generally as agricultural chemicals. They are particularly effective as insecticides, fungicides, herbicides, plant defoliants and the like. Preferably the compounds of this invention which are employed for these applications are the derivatives, particularly the olefin derivatives (esters), of the primary cyclo-organo phosphorus compounds.

The compounds of this invention which in most cases are viscous liquids (generally), are best distributed in the form of sprays, such as in aqueous dispersions or dust compositions of the active ingredient with a powdered clay.

Since the compounds of this invention are insoluble in water, it is preferable to use them admixed with wetting or emulsifying agents so as to be able to secure aqueous emulsions and consequent uniformity of dispersion in the resulting colloidal system. The use of these wetting agents also increases the spreading action of the spray by decreasing its surface tension. This results in the securing of better contact of the spray with the surface being treated, and consequently brings the active ingredient into intimate contact with the parasite life. The concentration of active ingredient in the aqueous emulsions varies with the insect pests to be treated. In general, the aqueous emulsion contains about 0.00001 to 10% active ingredient, and about 0.1 to 5% wetting agent by weight.

The active compounds of this invention may also desirably be made up in solid compositions. A dust composition containing about 1 to 10 weight percent active ingredient is made up by admixing the active compounds with clays such as fuller's earth, china clay, kaolin, or bentonite. Solid wettable powders for aqueous dispersion contain about 60 to 80% active ingredient, 20 to 40% clay, and about 0.1 to 5% wetting agent. Clay itself also acts as a spreading agent.

Among the water soluble wetting agents that can be used are the sulfates of long chain alcohols such as dodecanol up to octadecanol, sulfonated amide and ester derivatives, sulfonated aromatics, and mixed alkyl-aryl sulfonate derivatives, esters of fatty acids such as the ricinoleic acid ester of sorbitol, and petroleum sulfonates of $C_{10}$ to $C_{20}$ length. The non-ionic emulsifying agents such as the ethylene oxide condensation products of alkylated phenols may also be used.

Solvents for the compounds of this invention may be utilized as auxiliary agents if desired. Among the solvents for the compounds of this invention are: naphtha, kerosene, aromatics (toluene, etc.) alcohols, ketones such as acetone or methyl ethyl ketone, esters and halogenated hydrocarbons.

The compounds of this invention may also be admixed with carriers that are themselves active, such as other parasiticides, hormones, herbicides, fertilizers, and wetting agents. Insecticides such as the arsenates, fluorides, rotenone, the powdered roots or extracts of Derris, Cubé and the various fish poisons, also organic insecticides, such as di(p-)chlorophenyl-trichloroethane, benzene-hexachloride, and similar products may also be advantageously added.

The invention will be more fully understood by reference to the following examples. It is pointed out, however, that the examples are given for the purpose of illustration only and are not to be construed as limiting the scope of the present invention in any way.

EXAMPLE I.—PREPARATION OF DITHIOPHOSPHORIC ACID OF BETA BUTYLENE GLYCOL

A dithiophosphoric acid having the following structural formula

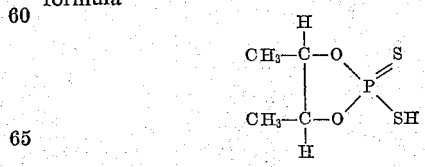

was prepared as follows: A 3 liter 4-necked flask equipped with a stirrer, condenser and thermometer was charged with 208 g. (2.3 m.) beta butylene glycol and 500 cc. benzol. Then 256 g. $P_2S_5$ was added during 3 minutes and the mixture heated to 70° C. during 10 minutes. It was held at 70° to 85° C. for 1 hour and 15 minutes when it was filtered through Hyflo by suction. After stripping off the solvent there was a residue of 422 g. of the crude dithiophosphoric acid having an Acid No. of 0.43 ceq./gm. A portion was distilled in a short path still at 3.0 mm. pressure and a fraction distilling at 120–142° C. and having an Acid No. of 0.53 ceq./gm. was obtained.

EXAMPLE II.—PREPARATION OF DITHIOPHOSPHORIC ACID OF NEOPENTYL GLYCOL

A dithiophosphoric acid having the following structural formula

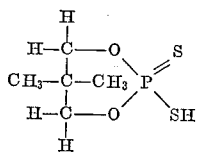

was prepared as follows: A 5 liter 4-necked flask equipped with a stirrer, condenser and thermometer was charged with 936 g. (9 m.) neopentyl glycol and 1500 cc. benzol. This mixture was heated to 45° C. when 999 g. (4.5 m.) $P_2S_5$ was added gradually during 20 minutes. Sufficient heat was applied to raise the temperature to 65° C. where it was held for 15 minutes. Then the mixture was gradually heated to 85° C. during the next 45 minutes making a total reaction time of 1 hour and 20 minutes. This was filtered hot through Hyflo leaving about 75 g. of unreacted $P_2S_5$.

The benzol was removed from the reaction product under reduced pressure with a final pot temperature of 145° C. at 4.0 mm. leaving a yield of 1782 g. of crude dithiophosphoric acid having an Acid No. of 0.442 ceq./g. (87.5% pure).

A 500 g. sample of the above crude product was distilled in a short path still as follows:

| Cut | Vapor Temp., °C. | Pressure, mm. | Amount, g. | Acid No., ceq./gm. |
|---|---|---|---|---|
| 1 [1] | 126–140 | 1.0 | 379 | 0.493 |
| 2 | 140–152 | 1.0 to 2 | 51 | 0.699 |
| Bottoms | | | 67 | 0.140 |

[1] Essentially the dithiophosphoric acid shown above.

EXAMPLE III.—PREPARATION OF DITHIOPHOSPHORIC ACID OF PINACOL

A dithiophosphoric acid having the following structural formula

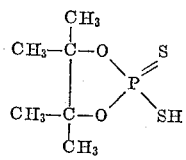

was prepared as follows: A 5 liter 4-necked flask equipped with a stirrer, condenser and thermometer was charged with 1064 g. (9 m.) pinacol and 1500 cc. benzol. After heating to 40° C. there was added 999 g. $P_2S_5$ during 5 minutes. Then the mixture was heated to 75° C. during the next 15 minutes. It was maintained at 75° to 90° C. for the next hour making a total reaction time of 1 hour and 20 minutes. After cooling to 70° C., the mixture was filtered through Hyflo leaving approximately 25 g. of unreacted $P_2S_5$. The benzol was then removed under reduced pressure in a short path still with a final pot temperature of 100° C. at 3.5 mm., leaving a yield of 1814 g. of crude dithiophosphoric acid. Acid No.=0.452 ceq./gm.

EXAMPLE IV.—PREPARATION OF DERIVATIVE A

An isobutylene ester of the dithiophosphoric acid of beta butylene glycol and having the following structural formula

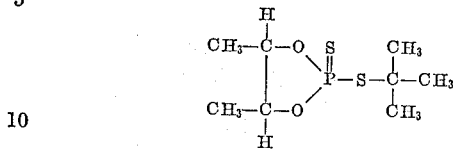

was prepared as follows: A 1″ x 12″ test tube was charged with 100 g. of the dithiophosphoric acid of beta butylene glycol. Isobutylene was injected through a porous tube for 1½ hours beginning at 25° C. and gradually raising the temperature to 80° C. There was an increase in weight of 25 g. or a yield of 125 g. of the isobutylene ester.

EXAMPLE V.—PREPARATION OF DERIVATIVE B

A styrene ester of the dithiophosphoric acid of beta butylene glycol having the following structural formula

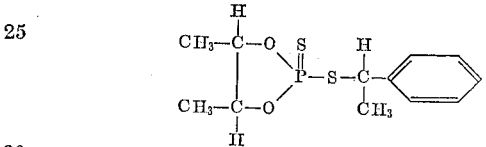

was prepared as follows: A 500 cc. Erlenmeyer flask was charged with 100 g. of the dithiophosphoric acid of beta butylene glycol and 70 g. styrene. There was a heat of reaction which caused the temperature to rise from an initial of 25° C. to 45° C. within 10 minutes. The reaction was completed by heating on the steam bath for 1 hour and then allowing to stand overnight at room temperature. The unreacted styrene was removed by stripping in a short path still to a pot temperature of 100° C. at 2.0 mm. Yield of styrene ester=142 g.

EXAMPLE VI.—PREPARATION OF DERIVATIVE C

A chloromethyl ether (of $C_{13}$ Oxo alcohol) derivative of the dithiophosphoric acid of neopentyl glycol having the following structural formula

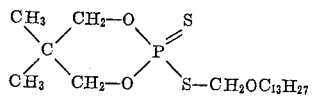

was prepared as follows: A 3-necked flask equipped with a stirrer, reflux condenser and dropping funnel was charged with 59.4 g. (0.3 mole) of neopentyl dithiophosphoric acid and 200 cc. of toluene. The dropping funnel was charged with 76.5 g. (0.3 mole) of tridecyl chloromethyl ether. A stream of nitrogen was passed through the reaction mixture and it was stirred while the tridecyl chloromethyl ether was added dropwise. The mixture was heated for three hours, then vacuum stripped to 110° C. pot temperature at 1 mm. mercury pressure. Yield= 126 g.

Analysis:

| Element— | Percent |
|---|---|
| H | 9.33 |
| C | 54.47 |
| S | 15.17 |
| P | 7.17 |

The tridecyl chloromethyl ether used in this example was prepared as follows:

A 5-liter, 4-necked flask equipped with a stirrer, condenser, thermometer and a porous glass gas inlet tube was charged with 2600 g. (13 moles) $C_{13}$ Oxo alcohol and 420 g. paraformaldehyde. After cooling to 5° C. HCl gas was injected into the mixture for 4 hours with the temperature at 5° to 30° C. Most of the paraformaldehyde was carried into solution by reaction and the mixture was transferred to a separatory funnel and the aqueous layer drawn off. The product was then dried with CaCl₂ and blown with N₂ to remove excess HCl. It was then filtered and distilled in a short path still in which the first portion and bottoms were discarded, collecting a heart cut of 2650 g. boiling at 115° to 119° C. at 0.3 mm.

EXAMPLE VII.—PREPARATION OF DERIVATIVE D

A methacrylonitrile ester of the dithiophosphoric acid of pinacol having the following structural formula

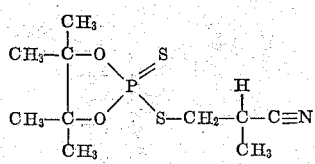

was prepared as follows: Pinacol dithiophosphoric acid (106 g., 0.5 mole) was melted, then allowed to cool to 50° C. at which temperature it started to crystallize. Freshly distilled methacrylonitrile (43 g., 0.64 mole) was added with stirring. The temperature rose spontaneously to 80° C. and was maintained at 70–80° C., first by cooling, then by heating, for twenty minutes. The product was vacuum stripped to 85° C. at 1 mm. mercury pressure. The resulting residue (133 g.) was a light yellow oil having essentially the formula shown above.

EXAMPLE VIII.—PREPARATION OF DERIVATIVE E

A cyclopentenyl ester of the dithiophosphoric acid of neopentyl glycol having the following structural formula

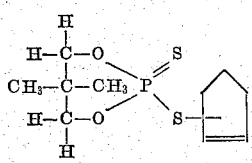

was prepared as follows: A 1-liter round bottom flask was charged with 96 g. of crude dithiophosphoric acid of neopentyl glycol, 100 g. benzol and 40 g. cyclopentadiene at 25° C. Within 10 minutes the heat of reaction had raised the temperature to 60° C. It was then placed on the steam bath for an hour, after which it was allowed to stand at room temperature overnight. The product was then stripped to a pot temperature of 110° C. at 3.0 mm. Yield=125 g.

EXAMPLE IX.—PREPARATION OF DERIVATIVE F

A styrene ester of the dithiophosphoric acid of neopentyl glycol having the following structural formula

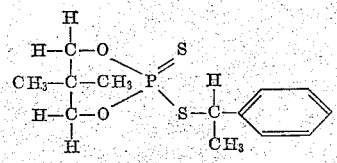

was prepared as follows: A 500 cc. Erlenmeyer flask was charged with 96 g. of crude dithiophosphoric acid of neopentyl glycol and 60 g. styrene. Within 10 minutes the temperature rose from an initial of 25° C. to 77° C. The flask was then placed on the steam bath for 2 hours, after which the reaction product was stripped to a pot temperature of 95° C. at 1.0 mm. Yield of styrene ester=140 g.

EXAMPLE X

The derivatives prepared in Examples IV to IX (Derivatives A, B, C, D, E and F) were then evaluated as oxidation-corrosion inhibitors in a standard bearing corrosion test, the derivatives being each evaluated at a concentration of 0.5% by weight in a mineral lubricating oil base stock (hereinafter referred to as Base Stock). The Base Stock was a phenol extracted an solvent dewaxed mineral lubricating oil having a viscosity of about 66.0 SUS at 210° C. and a viscosity index of about 103, and was derived from Mid-Continent crude oil.

The corrosion test which was employed to evaluate Derivatives A to F, as well as the Base Stock alone, was carried out as follows: 500 cc. of the oil was placed in a glass oxidation tube (13 inches long and 2⅝ inches in diameter) fitted at the bottom with a ¼ inch air inlet tube perforated to facilitate air distribution. The oxidation tube was then immersed in a heating bath so that the oil temperature was maintained at 325° F. during the test. Two quarter sections of automotive bearings of copper-lead alloy of known weight having a total area of 25 sq. cm. were attached to opposite sides of a stainless steel rod which was then immersed in the test oil and rotated at 600 r.p.m., thus providing sufficient agitation of the sample during the test. Air was then blown through the oil at the rate of 2 cu. ft. per hour. At the end of each 4-hour period the bearings were removed, washed with naphtha and weighed to determine the amount of loss by corrosion. The bearings were then repolished (to increase the severity of the test), reweighed, and then subjected to the test for additional 4-hour periods in like manner. The results are given in the following table as "corrosion life," which indicates the number of hours required for the bearings to lose 100 mg. in weight, determined by interpolation of the data obtained in the various periods.

| Oil or oil blend: | Bearing corrosion life (hrs.) |
| --- | --- |
| Base Stock | 13 |
| Base Stock+0.5 wt. percent of Derivative A | 33 |
| Base Stock+0.5 wt. percent of Derivative B | 35 |
| Base Stock+0.5 wt. percent of Derivative C | 34 |
| Base Stock+0.5 wt. percent of Derivative D | 39 |
| Base Stock+0.5 wt. percent of Derivative E | 36 |
| Base Stock+0.5 wt. percent of Derivative F | 35 |

It will be noted that addition of Derivatives A to F of the present invention substantially increased the bearing life. More specifically, the bearing life was increased to about threefold the original value by the addition of only 0.5 weight percent of each of the Derivatives A to F.

EXAMPLE XI.—PREPARATION OF DITHIOPHOSPHORIC ACID OF 2-ETHYL-2-BUTYL PROPANE DIOL-1,3

The dithiophosphoric acid of 2-ethyl-2-butyl propane diol-1,3-having the following structural formula

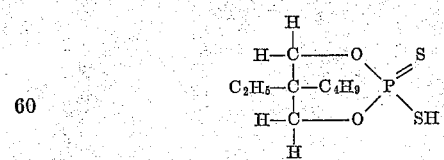

was prepared as follows: A 5-liter, 4-necked flask equipped with a stirrer, condenser and thermometer was charged with 1280 g. (8 m.) 2-ethyl, 2-butyl propane diol-1,3 and 1000 cc. benzol. This was heated to 55° C. and then 888 g. (4 m.) P₂S₅ was added during 5 minutes. The temperature was then raised to 70° C. and held at 70° C. to 95° C. for 1 hour, after which the product was filtered through Hyflo. There was a residue of about 50 g. of unreacted P₂S₅. The benzol was removed under reduced pressure finally heating to a pot temperature of 100° C. at 4.0 mm. A yield of 1906 g. of crude dithiophosphoric acid was obtained having an Acid No. of 0.338 ceq./gm.

EXAMPLE XII.—PREPARATION OF DERIVATIVE G

The isobutyl ester of the dithiophosphoric acid of 2-ethyl-2-butyl propane diol-1,3 having the structural formula

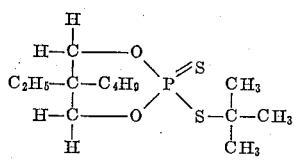

was prepared as follows: A 1″ x 12″ test tube was charged with 100 g. of the dithiophosphoric acid of 2 - ethyl - 2-butyl propane diol-1,3 and then isobutylene was injected into it thorugh a porous tube at 60° to 80° C. for 2 hours. Yield of isobutyl ester=119.5 g.

The following additional derivatives were also prepared: (1) the acrylonitrile, methacrylonitrile, isobutylene, methyl methacrylate, ethylene oxide, propylene oxide, butadiene and epichlorhydrin derivatives of the dithiophosphoric acid of neopentyl glycol; (2) the styrene, isobutylene and cyclopentadiene derivatives of the dithiophosphoric acid of 2-ethyl-2-butyl propane diol-1,3; (3) the acrylonitrile, methacrylonitrile, cyclopentadiene, and epichlorhydrin derivatives of the dithiophosphoric acid of 2,3 butane diol; (4) the styrene, acrylonitrile, isobutylene, cyclopentadiene, vinyl acetate, methyl methacrylate, butadiene monoxide and epichlorhydrin derivatives of the dithiophosphoric acid of pinacol.

This is a division of U.S. application Serial No. 528,112, entitled "Cyclo-Organo Compounds of Phosphorus," filed August 12, 1955.

What is claimed is:
1. A compound of the formula

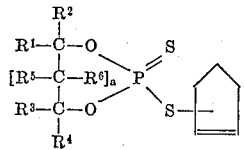

where $R^1$, $R^2$, $R^3$, $R^4$, $R^5$, and $R^6$ are each mmebers selected from the group consisting of hydrogen atoms and alkyl radicals containing 1 to 10 carbon atoms, and $a$ is a whole number of value 0 to 1.

2. A compound of the formula

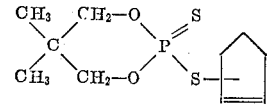

References Cited in the file of this patent
UNITED STATES PATENTS

| | | |
|---|---|---|
| 2,596,076 | Hook et al. | May 6, 1952 |
| 2,611,728 | Bartlett et al. | Sept. 23, 1952 |
| 2,661,365 | Gamrath et al. | Dec. 1, 1953 |
| 2,661,366 | Gamrath et al. | Dec. 1, 1953 |
| 2,744,128 | Morris et al. | May 1, 1956 |
| 2,841,605 | Lanham | July 1, 1958 |
| 2,842,527 | Melamed | July 8, 1958 |
| 2,843,586 | Melamed | July 15, 1958 |
| 2,859,086 | Feild et al. | Nov. 4, 1958 |
| 2,876,244 | Lanham | Mar. 3, 1959 |
| 2,876,245 | Lanham | Mar. 3, 1959 |
| 2,892,862 | Lanham | June 30, 1959 |
| 2,900,407 | Lanham | Aug. 18, 1959 |
| 2,903,474 | Lanham | Sept. 8, 1959 |
| 3,006,946 | Lanham | Oct. 31, 1961 |
| 3,020,305 | Chupp | Feb. 6, 1962 |
| 3,021,354 | Lanham | Feb. 13, 1962 |
| 3,028,302 | Chupp | Apr. 3, 1962 |

OTHER REFERENCES

Arbuzov et al.: "Chem. Abst.," vol. 42, col. 4932–4934 (1948).

Arbuzov et al.: "Chem. Abst.," vol. 45, col. 1512–1513 (1951).

Arbuzov et al.: "Bull. Acad. Sci. U.S.S.R., Div Chem. Sci." (English trans.) (1954), pp. 711–716.